US006922378B2

(12) United States Patent
Shen

(10) Patent No.: US 6,922,378 B2
(45) Date of Patent: Jul. 26, 2005

(54) METHOD AND APPARATUS FOR CONTROLLING THE DISK TRAY BY DETECTING THE BACK EMF FORCE

(75) Inventor: Hant Shen, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 167 days.

(21) Appl. No.: 10/355,028

(22) Filed: Jan. 31, 2003

(65) Prior Publication Data

US 2004/0114476 A1 Jun. 17, 2004

(30) Foreign Application Priority Data

Dec. 12, 2002 (TW) ........................................ 91135944 A

(51) Int. Cl.$^7$ ............................................. G11B 21/08
(52) U.S. Cl. ................................ 369/30.27; 369/30.36; 720/606
(58) Field of Search ................................ 720/602, 606, 720/601, 609; 369/30.27, 33.01, 77.2, 75.2, 77.1, 75.1, 30.36

(56) References Cited

U.S. PATENT DOCUMENTS

| | | | | |
|---|---|---|---|---|
| 5,210,725 A | * | 5/1993 | Kase et al. ................... 369/19 |
| 5,485,330 A | * | 1/1996 | Hirose et al. ............ 360/99.06 |
| 5,574,711 A | * | 11/1996 | Nakamichi ................... 720/602 |
| 5,784,350 A | * | 7/1998 | Akiba et al. ................ 720/606 |
| 6,005,833 A | * | 12/1999 | Yasuma et al. ............. 720/602 |
| 6,041,030 A | * | 3/2000 | Ohmi ....................... 369/53.19 |

* cited by examiner

Primary Examiner—Tan Dinh
(74) Attorney, Agent, or Firm—Birch, Stewart, Kolasch & Birch, LLP

(57) ABSTRACT

This invention relates specifically to a method for controlling the disc tray of a data reproducing device, in which the data reproducing device comprises at least a tray motor for driving the disc tray. The method comprises the following steps, including: a step for disposing a detection circuit electrically connected with the motor for detecting a back emf, which is generated when the motor is driven to rotate by an external force; a step for outputting from the detection circuit a signal of moving disc tray when the back emf is sensed; a step for a servo-controller to receive a signal of moving disc tray; and a step for the servo-controller to move the disc tray into the data reproducing device after the signal reception is completed.

11 Claims, 6 Drawing Sheets

METHOD AND APPARATUS FOR CONTROLLING THE DISK TRAY BY DETECTING THE BACK EMF FORCE

FIELD OF THE INVENTION

This invention relates to a method for controlling a data reproducing device, more particularly, it relates to a method for controlling in-and-out of the disc tray of a data reproducing device by means of a back electromotive force (emf) generated by a tray motor.

BACKGROUND OF THE INVENTION

The in-and-out control of a disc tray in a conventional CD/DVD player or CD/DVD ROM is based on the position detection of the disc tray by means of a mechanical switch. In practice, a position of the disc tray is defined to contact with and push a mechanical switch to an "ON" state when the tray is dragged out of a CD player, or, to an "OFF" state on the contrary. By this way, the program is provided to monitor the ON/OFF change of the mechanical switch to perform in-and-out movements of the disc tray.

Unfortunately, the mechanical switch has a limited lifetime as a detection measure for in-and-out control of the disc tray in a conventional CD/DVD player or CD/DVD ROM, which is scrapped as long as the switch is damaged. To remedy this defect, it would require a high-quality mechanical switch at a high cost.

SUMMARY OF THE INVENTION

In view of abovesaid defects, the primary objective of this invention is to provide a method applicable to the data reproducing device of tray type for controlling in-and-out of the disc tray thereof.

In order to realize the objective, this invention is more specifically to provide a method for controlling the disc tray of a data reproducing device and the data reproducing device thereof, in which the data reproducing device comprises at least a tray motor. The method for controlling the disc tray comprises the following steps, including: a step for disposing a detection circuit connected with the tray motor electrically for detecting a back emf, which is generated when the motor is driven to rotate by an external force; a step for outputting from the detection circuit a signal of moving disc tray when the back emf is sensed; a step for a servo-controller to receive a signal of moving disc tray; and a step for the servo-controller to move the disc tray into the data reproducing device after the signal reception is completed.

Another objective of this invention is to provide a data reproducing device of tray type, which comprises: a motor for driving the disc tray; a detection circuit for detecting a back emf generated by the motor when the motor is driven to rotate by an external force, and for outputting a signal of moving disc tray when the back emf is detected; and a servo-controller for moving the disc tray into the data reproducing device upon receipt of the signal of moving disc tray.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
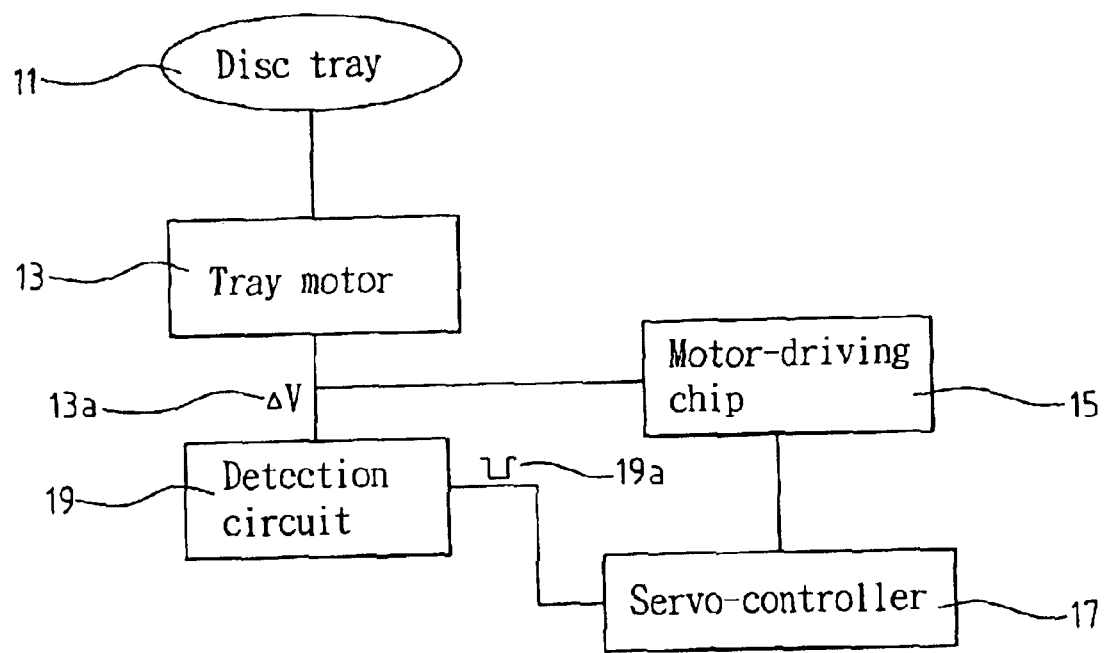
FIG. 1 shows the configuration of a data reproducing device of tray type to which the method of this invention is applicable.

FIG. 1 shows the configuration of a data reproducing device of tray type of this invention. A disc tray 11 shown in FIG. 1 is mechanically connected with a tray motor 13 such that the disc tray 11 will be driven to move outwardly or inwardly when the tray motor 13 is rotated. The tray motor 13 is driven to rotate by a driving voltage outputted from a motor-driving chip 15 which is controlled by commands from a servo-controller 17.

Figure 2:
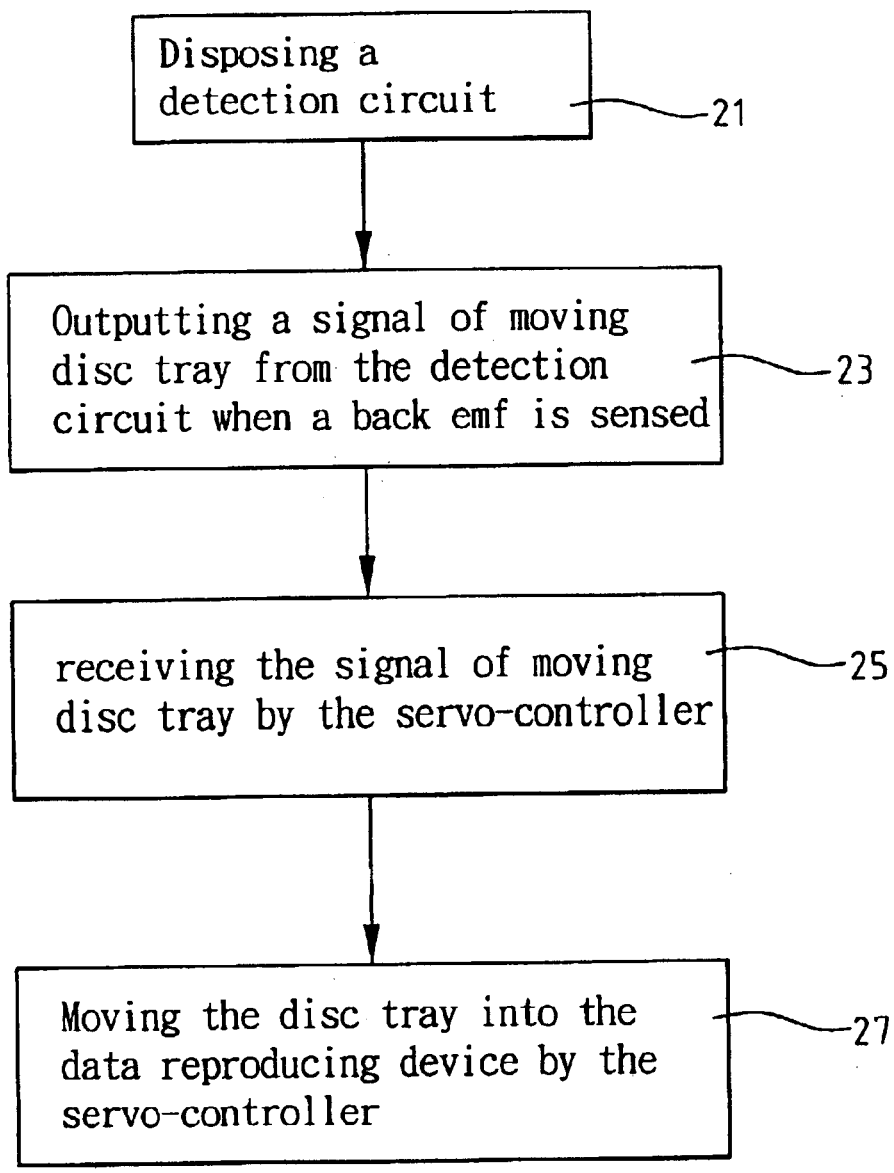
FIG. 2 indicates a flowchart of the method of this invention.

FIG. 2 shows a flowchart of the method of this invention. In FIG. 2, a step (21) is to arrange a detection circuit 19, which is electrically connected with the tray motor 13, for detecting a back emf (electromotive force) $\Delta V$ 13a which is generated when the motor 13 that drives the disc tray 11 is driven to rotate by an external force. In case the disc tray 11 of the data reproducing device of tray type is in the state of being pushed, for example, by an external artificial force and dragged inwardly, the displacement of the disc tray 11 made by the external force would drive the tray motor 13 to rotate due to the mechanical interconnection between the disc tray 11 and the tray motor 13. In this moment, a physical phenomenon known as the back emf 13a is thus created in the tray motor 13 (referring to FIG. 4 for the waveform of the back emf 13a). The detection circuit 19 prepared by the method of this invention is for the use of detecting the back emf 13a. In the event a back emf 13a is sensed by the detection circuit 19, it means an inward displacement of the disc tray 11 is effected.

Figure 4:
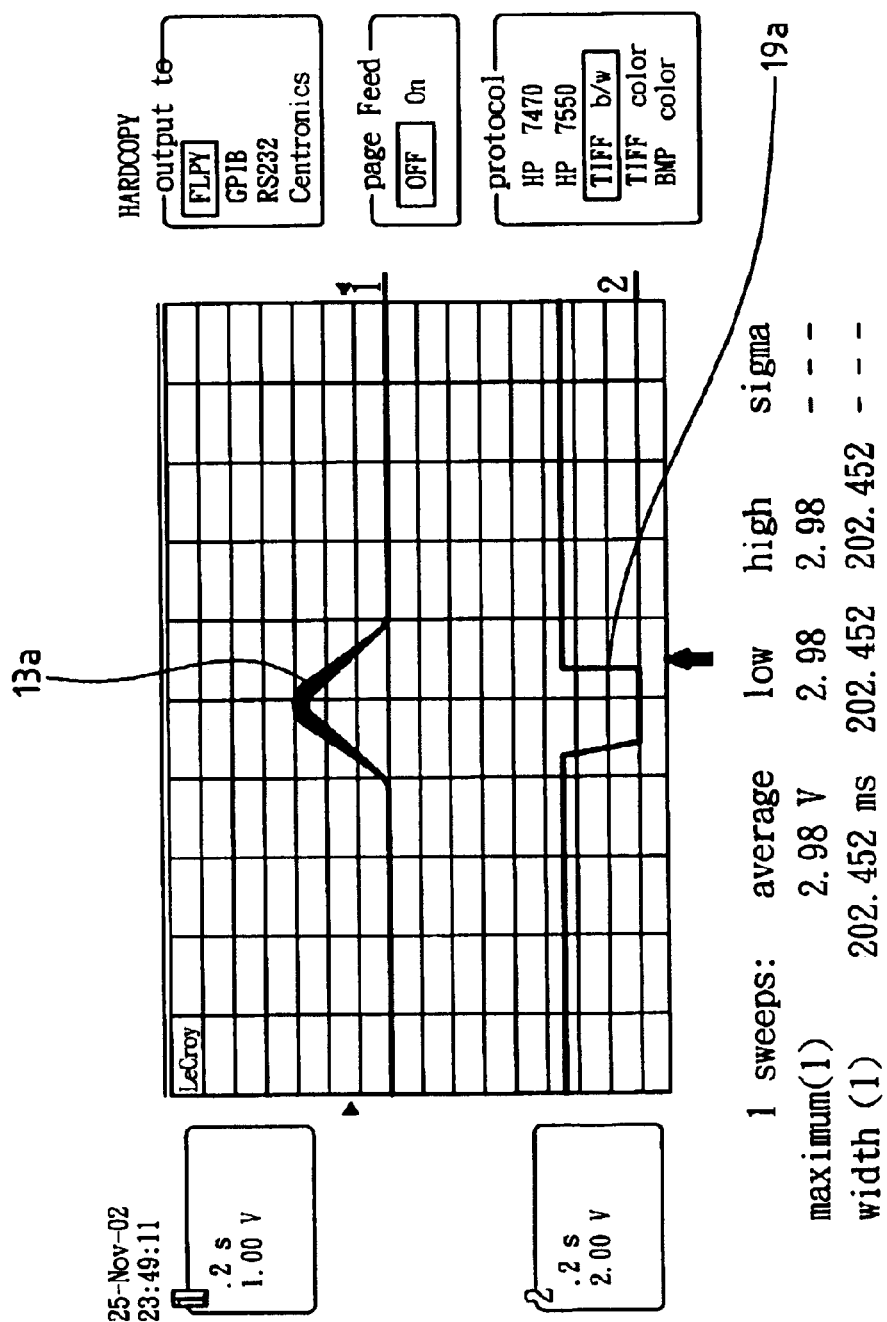
FIG. 4 shows the back emf and the signal waveforms of the disc tray of this invention.

FIG. 4 shows the back emf and the waveforms of a signal 19a for moving the disc tray. A step (23) is to detect the signal 19a for moving the disc tray outputted from the detection circuit 19 after the back emf 13a is sensed, where the outputted signal 19a from the detection circuit 19 is provided as an input signal to a next stage thereafter. The method of this invention further comprises a step (25) for the servo-controller 17 to receive the signal 19a for moving the disc tray, and a step (27) for the servo-controller 17 to enable the disc tray 11 to be moved into a data reproducing device, after reception of the signal 19a for moving the disc tray.

Figure 3A:
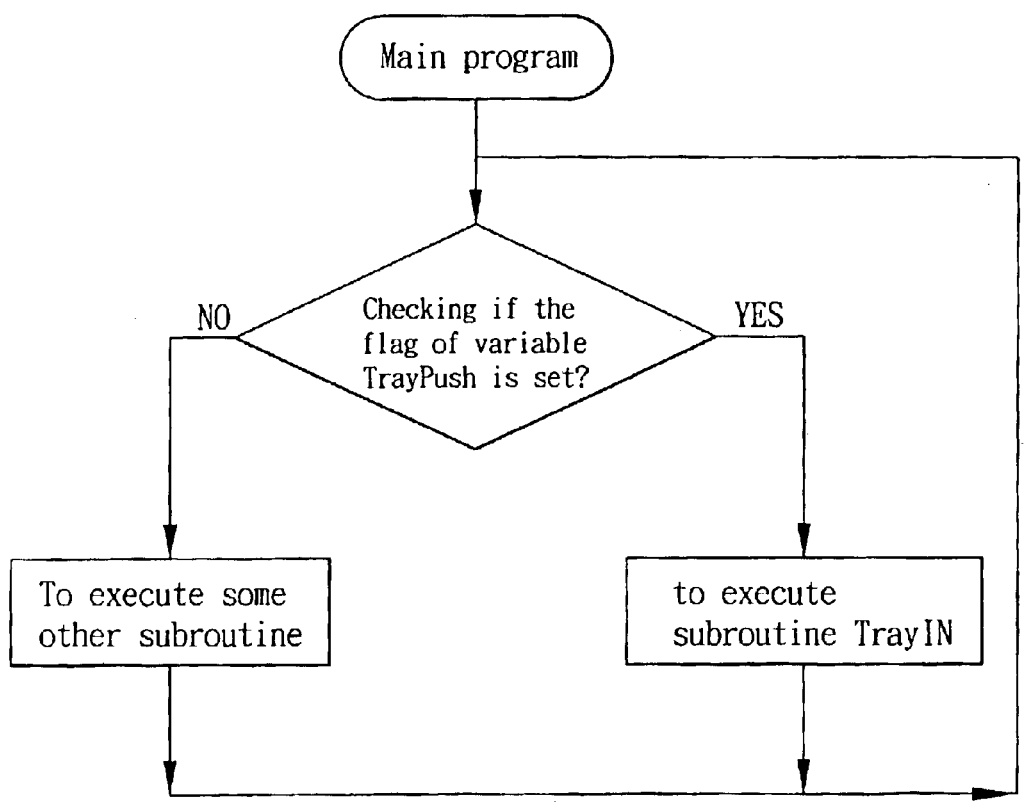
FIG. 3A shows a flowchart of a main program of this invention.
Figure 3B:
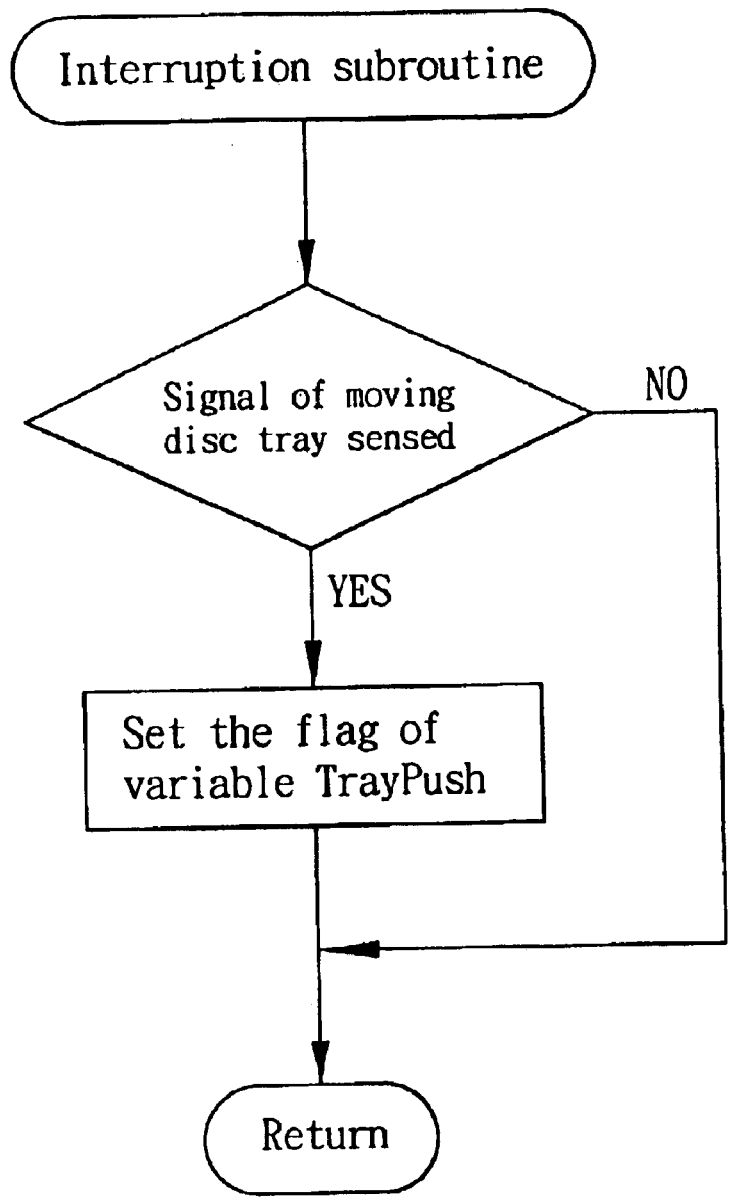
FIG. 3B shows a flowchart of an interruption subroutine of this invention.

The specific embodiment of the step (25) and the step (27) could be achieved by executing the programs with the servo-controller 17 adopted in this invention. FIG. 3A shows a flowchart of a main program of this invention, and FIG. 3B shows a flowchart of an interruption subroutine of this invention. When the servo-controller 17 receives a signal 19a for moving the disc tray, an interruption happens and the servo-controller 17 is supposed to execute the interruption subroutine of FIG. 3B for setting up the flag of variable "TrayPush" to indicate a displacement of the disc tray by an external force. After returning from the interruption back to the main firmware program, the servo-controller 17 will check whether the flag of the variable TrayPush is set or not, if positive, go to execute subroutine "TrayIN" for moving the disc tray into the data reproducing device; otherwise, go to some other subroutine.

Figure 5:
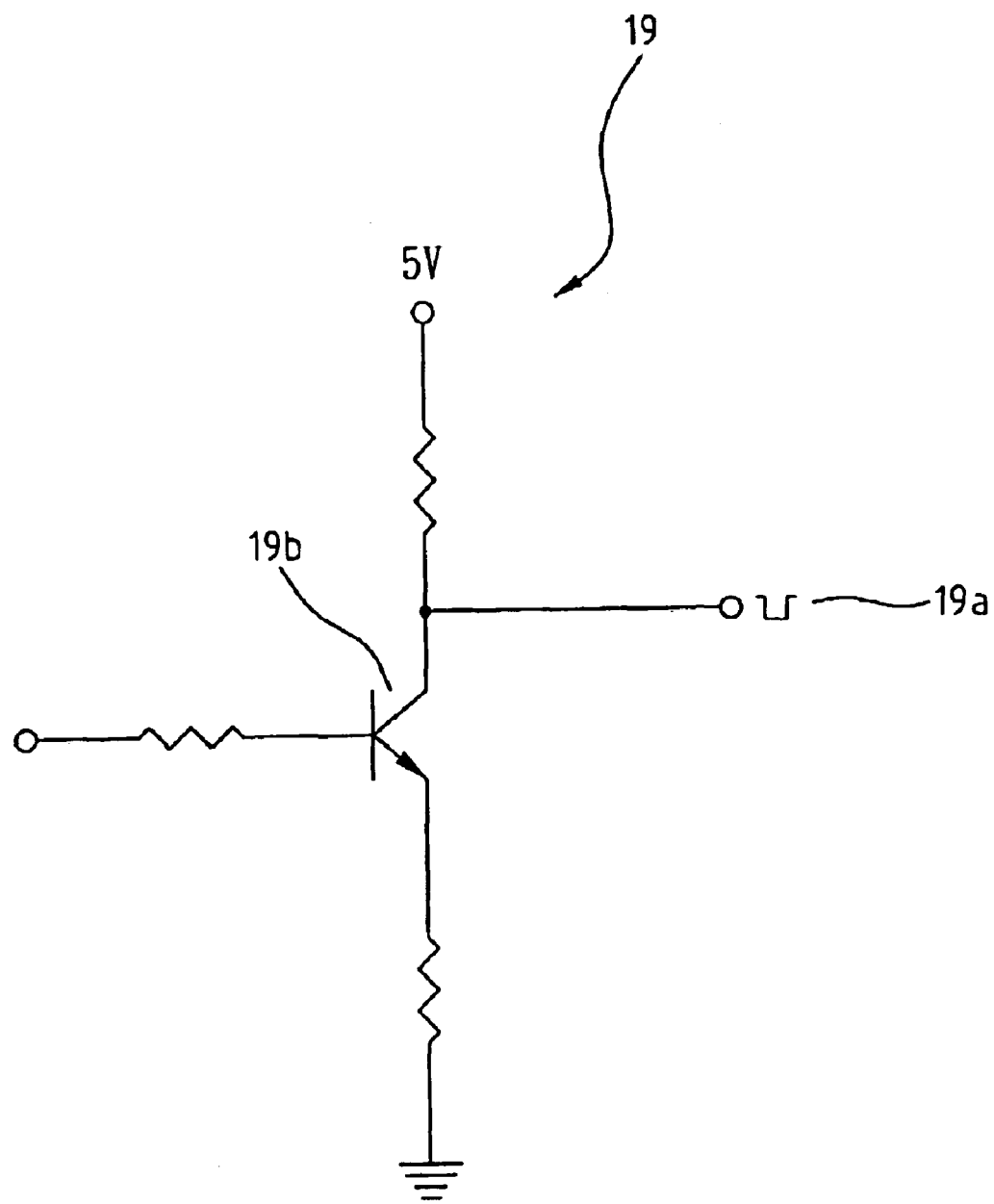
FIG. 5 shows a specific embodiment of a detection circuit of this invention.

FIG. 5 shows a specific embodiment of a detection circuit, substantially a transistor-amplification circuit, in which the base of a transistor 19b is arranged for receiving the signal of a back emf 13a, and the signal 19a for moving the disc tray is outputted from the collector of the transistor.

The data reproducing device of tray type according to this invention could be a DVD/VCD/CD player, DVD/VCD/CD ROM, etc.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A method for controlling the disc tray of a data reproducing device of tray type, in which said data reproducing device comprises at least a tray motor for driving the disc tray, comprising the steps of:

disposing a detection circuit connected with the motor electrically for detecting a back emf (electromotive force), which is generated when the motor is driven to rotate by an external force; and outputting from the detection circuit a signal of moving disc tray when said back emf is sensed.

2. The method according to claim 1, further comprising a step for a servo-controller to receive said signal of moving disc tray.

3. The method according to claim 2, further comprising a step for the servo-controller to move the disc tray into said data reproducing device upon receipt of said signal of moving disc tray.

4. The method according to claim 1, in which said detection circuit is a transistor amplification circuit.

5. The method according to claim 1, in which said data reproducing device is a DVD/VCD/CD player.

6. The method according to claim 1, in which said data reproducing device is a DVD/VCD/CD ROM.

7. A data reproducing device of tray type, comprising:

a motor for driving a disc tray; and a detection circuit being connected with said motor electrically, for detecting a back emf generated by said motor when said motor is driven to rotate by an external force, and for outputting a signal of moving disc tray when the back emf is sensed.

8. The data reproducing device according to claim 7, further comprising a servo-controller for receiving said signal of moving disc tray and for moving said disc tray into the data reproducing device upon receipt of said signal of moving disc tray.

9. The data reproducing device according to claim 7, in which said detection circuit is a transistor amplification circuit.

10. The data reproducing device according to claim 7, in which said data reproducing device is a DVD/VCD/CD player.

11. The data reproducing device according to claim 7, in which said data reproducing device is a DVD/VCD/CD ROM.

* * * * *